United States Patent
Paud et al.

(10) Patent No.: US 11,633,750 B2
(45) Date of Patent: Apr. 25, 2023

(54) DEVICE AND METHOD FOR TRANSFERRING VISCOUS MATERIAL

(71) Applicant: FIVES FILLING & SEALING, Le Bignon (FR)

(72) Inventors: Pascal Paud, Le Bignon (FR); Dominique Praud, Le Bignon (FR)

(73) Assignee: FIVES FILLING & SEALING, Le Bignon (FR)

( * ) Notice: Subject to any disclaimer, the term of this patent is extended or adjusted under 35 U.S.C. 154(b) by 0 days.

(21) Appl. No.: 17/188,471

(22) Filed: Mar. 1, 2021

(65) Prior Publication Data

US 2021/0268528 A1  Sep. 2, 2021

(30) Foreign Application Priority Data

Mar. 2, 2020  (FR) ..................... 20 02086

(51) Int. Cl.
*B05B 9/04* (2006.01)
*B05C 5/02* (2006.01)
*B05C 11/10* (2006.01)

(52) U.S. Cl.
CPC .............. *B05B 9/0413* (2013.01); *B05C 5/02* (2013.01); *B05C 11/1002* (2013.01)

(58) Field of Classification Search
CPC ..... B05C 5/02; B05C 11/1002; B05B 9/0413; B67D 7/645; B67D 7/80; B67D 7/0227; B67D 7/62; B67D 7/64; B67D 7/68
USPC ......................................... 222/146.5, 259, 1
See application file for complete search history.

(56) References Cited

U.S. PATENT DOCUMENTS

| | | | | |
|---|---|---|---|---|
| 2,630,248 A | * | 3/1953 | Hinz | .................... B67D 7/0227 222/320 |
| 3,982,669 A | | 9/1976 | Moore | |
| 4,090,640 A | * | 5/1978 | Smith | ..................... F04B 15/00 222/413 |
| 4,227,069 A | * | 10/1980 | Gardner | ................ B29B 13/022 219/214 |

(Continued)

FOREIGN PATENT DOCUMENTS

| | | |
|---|---|---|
| DE | 10 2014 114374 | 3/2016 |
| DE | 102014114374 B3 * | 3/2016 ............... B30B 9/00 |

(Continued)

OTHER PUBLICATIONS

Espacenet Machine Translation of the description of DE102014114374A (Year: 2014).*
Search Report for FR2002086, dated Aug. 17, 2020, 2 pages.

*Primary Examiner* — Charles P. Cheyney
(74) *Attorney, Agent, or Firm* — Nixon & Vanderhye (57) ABSTRACT

Disclosed is a device for pressurizing a viscous fluid contained in a drum, the device includes a follower plate vertically movable along a perpendicular axis passing through the center of the drum, the follower plate: is movable between a first position outside the drum and a second position inside the drum, to exert pressure on the viscous fluid; has a transfer port intended to be connected to a means of pumping capable of transferring the pressurized fluid. The device further includes an energy storage unit and restoration connected to the support system, the storage unit being capable of storing energy under the effect of the pressure exerted by the support system and of restoring it to the follower plate in order to maintain the viscous fluid under pressure.

12 Claims, 8 Drawing Sheets

(56) References Cited

U.S. PATENT DOCUMENTS

| | | | | |
|---|---|---|---|---|
| 4,355,734 A * | 10/1982 | Moore | ............... | B67D 7/80 |
| | | | | 222/64 |
| 4,534,493 A * | 8/1985 | Sedran | ............... | B67D 7/645 |
| | | | | 222/146.2 |
| 4,635,820 A * | 1/1987 | Marshall | ............... | B67D 7/80 |
| | | | | 222/405 |
| 5,553,740 A * | 9/1996 | King | ............... | B67D 7/0255 |
| | | | | 222/88 |
| 6,046,437 A * | 4/2000 | Frates | ............... | B29B 13/022 |
| | | | | 222/146.5 |
| 6,745,546 B2 * | 6/2004 | Tanner | ............... | B29C 48/08 |
| | | | | 53/140 |
| 10,239,681 B2 * | 3/2019 | Thompson | ............... | B67D 7/645 |
| 10,518,988 B1 * | 12/2019 | Hryckowian | ............... | B67D 7/645 |
| 10,974,954 B2 * | 4/2021 | Scheugenpflug | ............... | B67D 7/645 |
| 2019/0314858 A1 * | 10/2019 | Tasaka | ............... | B05D 7/14 |

FOREIGN PATENT DOCUMENTS

| | | |
|---|---|---|
| FR | 2 601 081 | 1/1988 |
| GB | 1 592 799 | 7/1981 |

* cited by examiner

DEVICE AND METHOD FOR TRANSFERRING VISCOUS MATERIAL

This application claims priority to FR Patent Application No. 20 02086 filed 2 Mar. 2020, the entire contents of which is hereby incorporated by reference.

TECHNICAL FIELD OF THE INVENTION

The present invention relates to the transfer of viscous fluids from a storage drum, by the application of high pressure by a follower plate facilitating the transfer of said viscous fluid by means of pumping to a distribution line.

The invention may be particularly suitable for the transfer of highly viscous fluids having a viscosity higher than 10000 MPa at a temperature of 20° C., for example, such as glue or sealing materials.

The invention can find application in particular in the automotive field for the application of glue beads in mirror manufacturing and in any field of use of highly viscous materials at high speed.

STATE OF THE ART

The pumping of highly viscous fluids is widely used in industry. For example, highly viscous glue is used in the automotive industry, for the assembly of mirror components, such as car windows. Typically, a robotic unit with a poly-articulated arm takes the support to be glued and moves it under a glue extrusion system. The glue is then dispensed onto the support through an extrusion nozzle while the support is moved along a registered trajectory.

For each support there is a corresponding specific path and a specific amount of glue, depending on the shape and size of the support, the size of the bead section and the speed of the support or of the nozzle.

The glue dispensing system typically comprises:
  a glue transfer station;
  a metering pump;
  feed hoses; and
  an extrusion system.

The transfer station typically comprises a transfer pump connected to a follower plate that puts pressure on the glue in the drum. The follower plate is typically moved by a system of pneumatic or hydraulic cylinders to exert this pressure on the glue. The transfer pump extracts the glue from the storage drum to feed the glue into the metering pump, which in turn feeds the glue into the extrusion system.

The current transfer stations enable a maximum pressure of around 20,000 N to be generated on the glue in the drum with the follower plate. They are suitable for low and medium viscosity fluids, but, for very high viscosity fluids, the pressure exerted by the follower plate does not enable the transfer pump to be filled, which causes a break in the flow of glue in the distribution line.

There are pneumatic solutions, supplied with compressed air to provide forces of 60,000 N. However, such solutions present significant risks due to the high air pressure in the cylinders. In addition, the operating cost is high due to the permanent use of the air compressor.

There are also hydraulic solutions that have drawbacks, including:
  the need for periodic maintenance with a monitoring plan due to the risk of oil leaks;
  noisy and expensive operation due to the high energy consumption to keep the pressure constant in the cylinders.

The purpose of the invention is therefore to remedy the problems of known solutions by proposing a fluid transfer station that enables sufficient pressure to be exerted to effectively deposit very high viscosity fluids while guaranteeing the safety of operators during its use and limiting the energy consumption.

SUMMARY OF THE INVENTION

For this purpose, according to a first aspect, the invention relates to a device for pressurizing a viscous fluid contained in a drum that has an open upper end, the device comprises a base arranged to receive the drum and a follower plate vertically movable along an axis perpendicular to said base, passing through the center of the drum when the latter is on the base, said follower plate:
  is carried by a motorized support system and is movable between a first position outside the drum and a second position inside the drum to exert pressure on the viscous fluid,
  has the same dimensions as the opening of the drum opening, so that when the follower plate is in the drum, its perimeter seals the drum,
  has a transfer port intended to be connected to a means of pumping capable of transferring the pressurized fluid,
the device further comprises a flexible means of energy storage and restoration connected to the support system, said means being capable of storing energy when it is compressed under the effect of the pressure exerted by the support system when the pressure of the follower plate on the viscous fluid is below a certain predetermined threshold and of restoring it to the follower plate when it is compressed in order to maintain the pressure of the viscous fluid while the support system is at rest.

The support system is said to be at rest when its means of motorization are not in operation.

The energy storage and restoration system enables the follower plate to exert permanent pressure on the viscous fluid without having to activate the means of displacement of the follower plate, that is, the means of motorization of the support system, at each fluid pumping cycle. Indeed, once the energy storage system is charged, the follower plate continues to exert pressure on the viscous fluid during its transfer as long as the fluid level in the drum has not reached a critical level. The critical level may be the pressure threshold at which fluid transfer becomes difficult or cut off, for example. When this threshold is reached, the means of motorization of the support system restarts and exerts pressure again on the follower plate, which in turn exerts pressure on the fluid.

If the fluid pumping is stopped while the means of motorization of the support system are in operation, the pressure exerted on the follower plate is transferred to the means of energy storage, to store it in order to restore it when the means of motorization of the support system are at rest. If the fluid pumping continues, the excess pressure exerted by the support system on the follower plate enables the storage means to be recharged.

This system makes it possible to obtain a good storage of restorable energy, of the order of 5000 N over an operating range of 10,000 to 60,000 N for example, in order to avoid starting the means of motorization of the support system at each fluid transfer cycle.

The pressure threshold may be programmed by a means of control, for example, or be detected by real time measurement or detected by a simple mechanical means of detection.

Advantageously, the energy storage and restoration system comprises a means that is flexible, arranged to be compressed to store energy and decompressed to restore the stored energy.

This is a simple, robust and easy to system for implementing energy storage. This flexible means may be put into compression directly by the support system or via the follower plate when it is in contact with the fluid. Subsequently, when the means of motorization of the support system are stopped while the means of pumping are activated to transfer the fluid, the energy stored by the flexible means is transferred to the follower plate while the flexible means is in the decompressed state.

Such a flexible means may be a spring for example, Belleville washers or other similar means.

Other types of energy storage and restoration means are also possible.

According to a first embodiment of the invention, the support system may for example comprise:
  a dock,
  two vertical guide tubes, each fixed to the base by a lower end and having a free upper end with a fixed means of guiding, said guide tubes being spaced by the base,
  two worm screws, each having a lower part inserted into one of the tubes via the means of guiding and an upper part outside the tube,
  an upper beam perpendicular to the worm screws, fixed to the upper ends of the two screws and comprising a means of rotating said worm screws,
  a lower beam perpendicular to the worm screws connected to the follower plate by two tie rods, said lower beam is movably mounted on the upper part of the worm screws when they are rotated so as to move the follower plate between the first and second position.

The means of energy storage and restoration may comprise:
  a compression component mounted on the lower part of a screw,
  a flexible component arranged in the tube between the compression component and an object fixed with respect to the tube, said object being closer to the upper end than the compression component, and
  a means of control capable of starting and stopping the compression of the flexible component by the compression component.

According to a second embodiment of the invention, the support system comprises:
  a bracket movably mounted in a guide column,
  two vertical guide tubes, each fixed to the bracket by a lower end with a fixed means of guiding,
  two tie rods, each having an upper part inserted into one of the tubes via the fixed means of guiding and a lower part on the outside of the tube connected to the follower plate,
  a means of moving the bracket in the guide column by a vertical translation movement so as to move the follower plate between the first and second position.

According to this second embodiment, the means of storage and restoration of energy comprises:
  a compression component mounted on the upper part of a tie rod,
  a flexible component arranged in the tube between the compression component and an object fixed with respect to the tube, said object being closer to the lower end than the compression component, and
  a means of control capable of starting and stopping the compression of the flexible component by the compression component.

Advantageously, the means of control may comprise a first detector and a first marker to trigger the storage of energy and a second detector and a second marker to stop the storage of energy. Such means of control are simple to achieve and inexpensive.

The first and/or second detector may be contact detector on a support ring, for example, and the marker may be a contact component, attached to the worm screw or the tie rod, for example.

Advantageously, the base may comprise a means of fixing the drum, such as electromagnets. This will ensure a good stability of the drum during pumping and when removing the follower plate.

The transfer station, according to the invention, may further comprise an impression and clamping device. For example, the dock of the transfer station may comprise a counter-impression, of the size and shape of the bottom of the drum. This counter-impression makes it possible to position and center the drum without any particular constraint on the operator. It also enables the prevention of deformation of the bottom of the drum 2 when pressure is exerted by the follower plate and by this fact can limit the loss of glue in the bottom of the drum.

The invention also relates to a viscous fluid transfer station that may comprise:
  A pressurization device according to the invention; and
  A means of pumping connected to the orifice of the follower plate.

The means of pumping is a pneumatic pump, for example, integral with the follower plate, for example.

The invention also relates to a system for dispensing viscous fluids, such as glue, comprising:
  a fluid transfer station
  a dosing pump; and/or
  supply lines; and/or
  a fluid extrusion system.

According to another aspect, the invention also relates to a method for transferring a viscous fluid by using the transfer station according to the invention.

Advantageously, the means of motorization of the support system comprises an electric motor.

The invention as described above further has the following advantages as compared with the known systems:
  very reduced maintenance;
  minimal energy consumption;
  a large and easy to use pressure plate adjustment range;
  very low noise generated;
  a reduced operating risk for the operator: slow speed of descent of the follower plate;
  the energy storage and restoration is a function of the production rate.

In addition, the invention makes it possible to start operating the system without requiring a prior energy storage phase.

In addition, the second embodiment of the invention also enables:
  a single worm screw/nut system to control the translational movement of the follower plate, eliminating the synchronization constraint of the two screws of the first embodiment,
  placing the motor to ensure the translation movement of the follower plate in a low position, which makes it more accessible for maintenance and enables lightening the structure, an energy storage and restoration system independent of the follower plate translation mechanism, which facilitates its assembly and maintenance, a restricted space around the drum.

BRIEF DESCRIPTION OF THE FIGURES

The invention will be better understood upon reading the description to follow of the embodiments, given as illustrative, non-limitative examples, in relation to the appended drawings among which.

DETAILED DESCRIPTION

Figure 1:
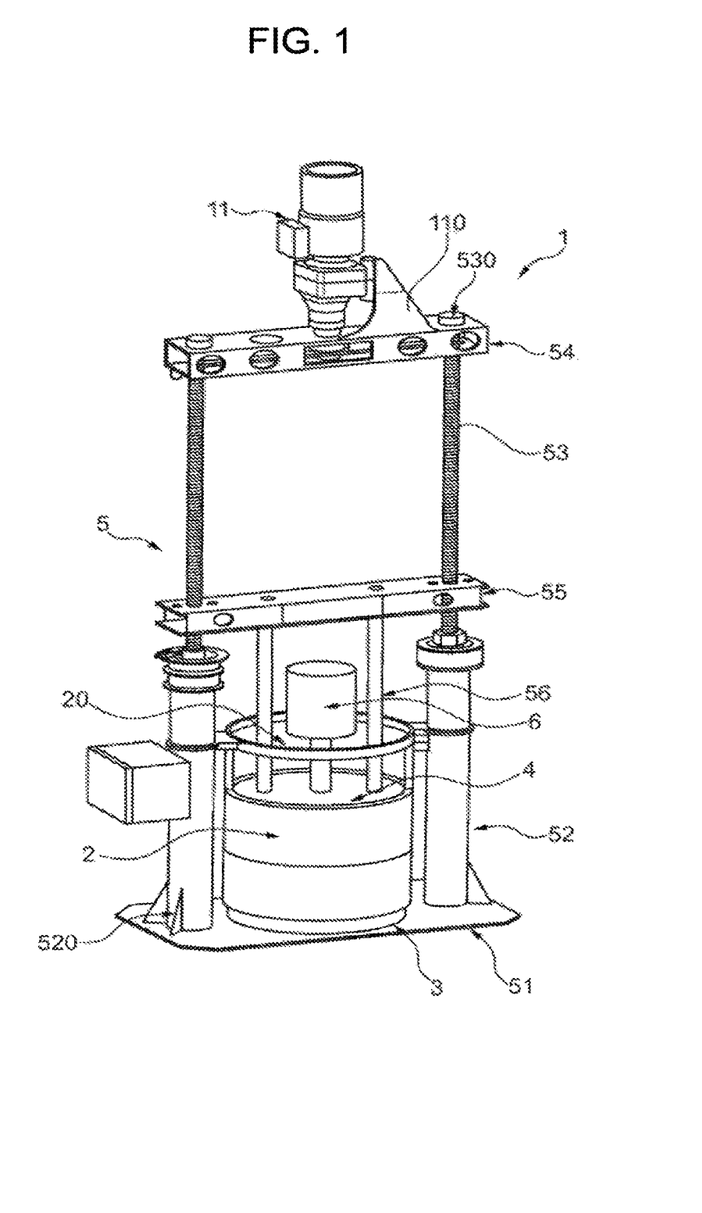
FIG. 1 is an overview of a viscous fluid transfer station according to a first example embodiment of the invention.

FIG. 1 shows a transfer station for a viscous fluid such as glue, according to a first example embodiment of the invention. The transfer station, also called a pumping station, as shown in FIG. 1, comprises a pressurization device 1 and a means of pumping 6.

The pressurization device 1 comprises a follower plate 4 carried by a support system 5. The said support system 5 comprises:

a dock 51, two vertical guide tubes 52 each fixed to the base 51 by a lower end 520 and having a free upper end 521 comprising a fixed means of guiding 522, said guide tubes being spaced apart by a base 3, two worm screws 53, each with a lower part 531 inserted into one of the guide tubes 52 by the means of guiding 522 and an upper part 532 on the outside of the tube 52, an upper beam 54 perpendicular to the worm screws 53, fixed to the upper ends 530 of the two worm screws 53 and comprising a means of rotating said worm screws 53, a lower beam 55 perpendicular to the worm screws 53 and connected to the follower plate 4 by two tie rods 56, said lower beam 55 is movably mounted on the upper part of the worm screws 53 when the worm screws 53 are rotated so as to move the follower plate 4.

The upper beam 54, is a motorization beam, and the movable lower beam 55 is also called elevator beam. The elevator beam 55, supporting the follower plate 4, is mounted movably on the two vertical worm screws 53, for example of the trapezoidal type (TRAP).

The two worm screws 53 have an axial extension 531 according to their length inside the guide tubes 52. In this design example, one worm screw 53 and its axial extension form a single piece. An axial extension 531 takes the form of an unthreaded cylinder, except for its lower end, which is threaded to receive a lock nut 71. An axial extension 531 is guided inside a guide tube 52 by a means of guiding 522 on the upper part of the tube 52 and by a lower guide ring 70 in the lower part of the tube.

The two worm screws 53 are held at their bases by the two guide tubes 52 fixed to the dock 51 and at their upper ends by the motorization beam 54. They are rotated simultaneously by a transmission system connected to their upper ends. The transmission system is driven by an electric motor 11 fixed on the motorization beam 54. The system of transmission and the motor 11 is an example of a motorization system.

A drum 2 containing glue to be transferred by the means of pumping 6 is placed between the two guide tubes 52.

The follower plate 4, integral with the elevator beam 55, is moved vertically by the rotation of the worm screws 53 in the axis of the opening 20 of the drum 2.

The transfer station, according to the invention, may further comprise an impression and clamping device. For example, the dock 51 of the transfer station may comprise a counter-impression of the size and shape of the bottom of the drum 2. This counter-impression makes it possible to position and ensure the centering of the drum 2 without any particular constraint on the operator. It also prevents deformation of the bottom of the drum 2 when pressure is exerted by the follower plate 4 and thus limits the loss of glue in the bottom of the drum.

For example, when the drum is made of metal or comprises a metal base, electromagnets may be placed under the dock 51 of the transfer station at the impression area. The electromagnets are activated, for example, when the follower plate 4 is lifted to change the drum 2. This prevents the glue from being lifted up by the suction effect of the glue between the follower plate and the bottom of the drum 2. This device frees the operator from any constraint of locking and unlocking a mechanical clamping of the drum and from the risk of falling in case of bad positioning.

Figure 2:
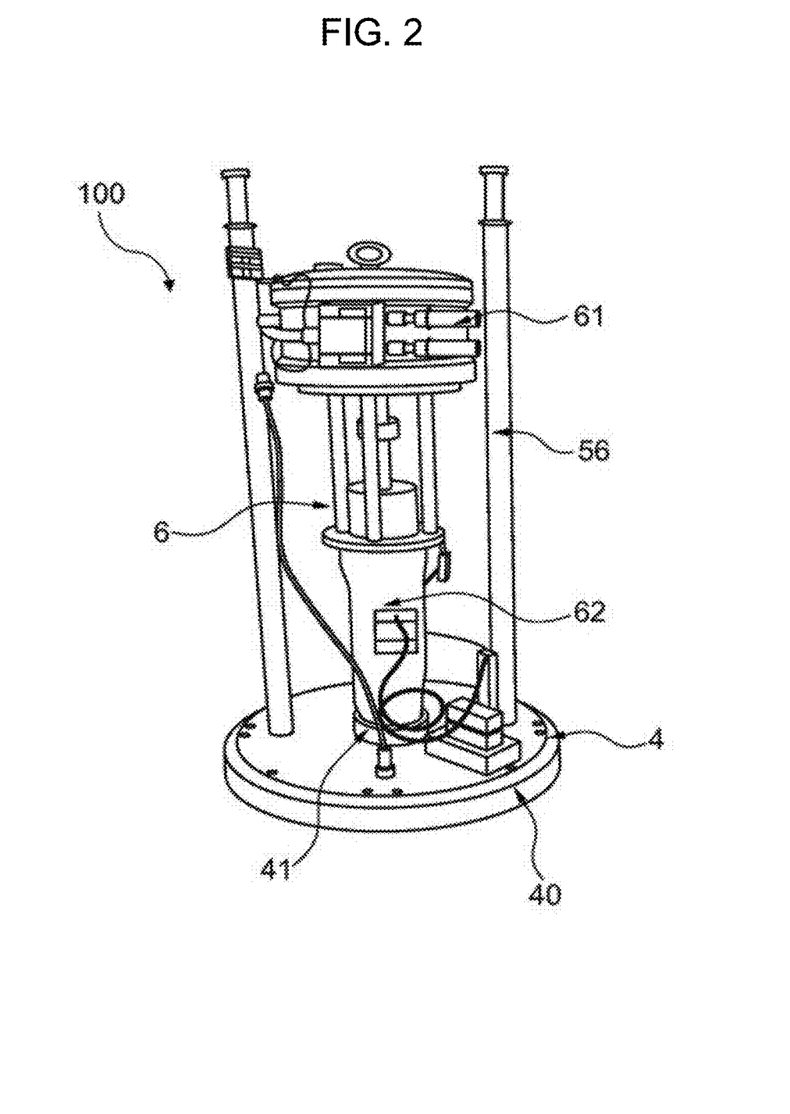
FIG. 2 is an overview of a follower plate assembly according to the example embodiment of the invention in FIG. 1 on which a pneumatic pump is mounted.

As shown in FIG. 2, the follower plate 4, the transfer pump 62 and the air motor 61 may be connected together. They enable the pressurization of the glue contained in the drum 2 via the follower plate 4 and the pumping of the glue contained in the drum, to transfer it at the desired flow rate and pressure to the metering pump and dispensing line (not shown). The follower plate 4 is fixed to the elevator beam 55 by two tie rods 56.

In other example embodiments, not illustrated, the transfer pump may be dissociated from the follower plate 4 but connected to the transfer port 41.

The force required to be applied to the glue is determined by the viscosity of the glue used. This force on the glue enables the glue to flow towards the body of the transfer pump 62 when the motor 61 of the pump is running. When the dispensing line (not shown) is filled, the pneumatic motor 61 of the transfer pump 62 is locked by the incompressibility of the glue. The pressure generated by this force-feeding may be controlled within a minimum and maximum pressure range, for example.

The pressurization support system 5 enables the follower plate 4 to be lowered until it comes into contact with the glue contained in the drum, then to be lowered further at the rate at which the glue is taken out of the drum, and to be raised when the drum is empty.

Figure 3:
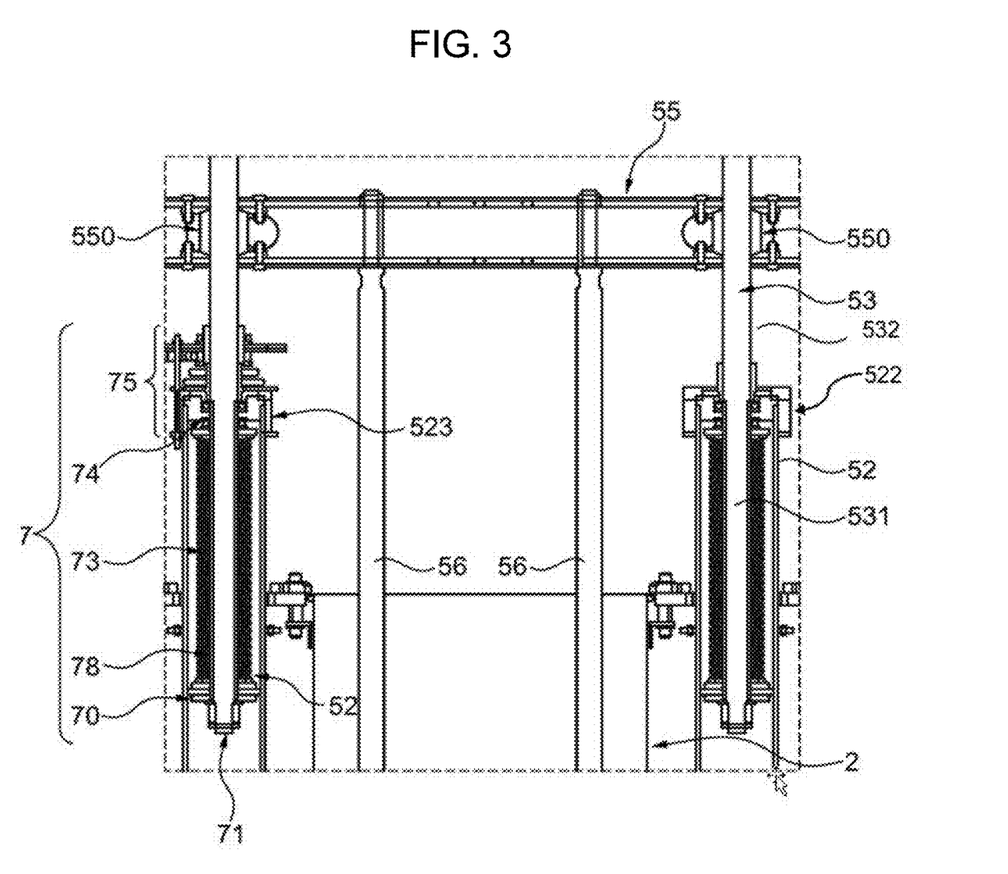
FIG. 3 shows a longitudinal section view, illustrating the energy storage and restoration system according to the example embodiment of the invention in FIG. 1.

As shown in FIG. 3, the elevator beam 55 to which the tie rods 56 holding the follower plate/transfer pump assembly are fixed is set in motion by the rotation of the trapezoidal worm screws 53 via the corresponding trapezoidal nuts 550.

The threads of the worm screws 53 are located on each side of the elevator beam 55. The trapezoidal nuts 550 are mounted in such a way as to be able to absorb possible misalignments of the worm screws 53 and are related to an anti-rotation mechanism in relation to the beam 55. The elevator beam 55 moves up and down horizontally.

The upper ends of the trapezoidal screws 53 are held and guided in the drive beam 54. An electric motor 11 is attached to the motorization beam 54. The screws 53 are rotated by the electric motor 11 via a transmission system such as chain driven sprockets or belt driven pulleys or mechanical angular gearboxes with a cardan shaft drive. The motor 11 is related to a gearbox 110. The motor 11 enables the screws 53 to be rotated clockwise or anticlockwise.

For example, the counter-clockwise rotation of the screws 53 makes the elevator beam 55 with the follower plate 4 and the transfer pump 6 go down.

Conversely, a clockwise rotation makes the whole assembly go up.

The guide tubes 52 can each comprise an energy storage and restoration device 7. As shown in FIG. 3, each device 7 may comprise:
 a flexible component 73, such as a coil spring, Belleville washers or wave springs,
 a lower guide 70 forming a compression component, and
 a compression thrust ball bearing 74.

Figure 4:
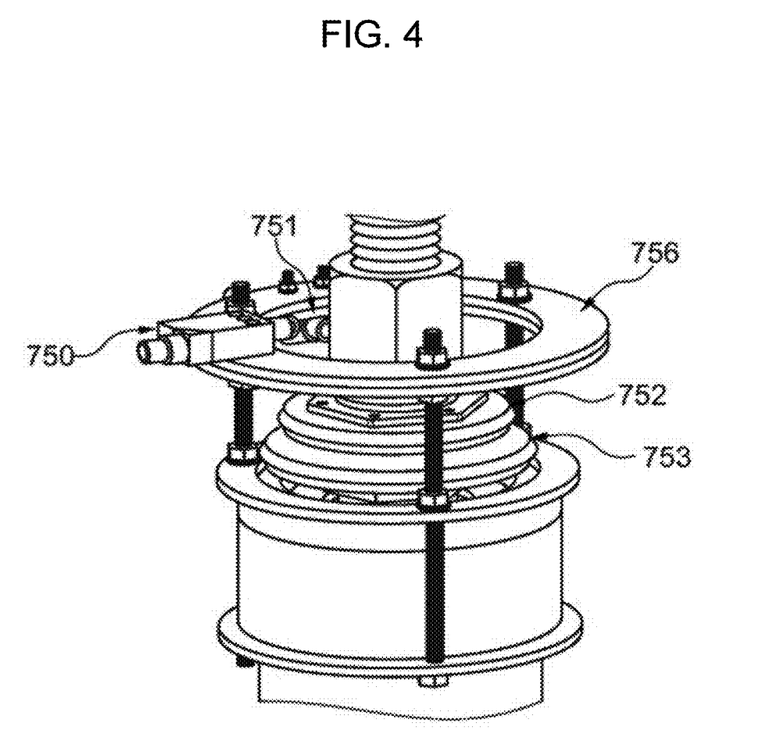
FIG. 4 shows a zoomed view of the energy storage and restoration control system according to the example embodiment of the invention in FIG. 1.
Figure 5:
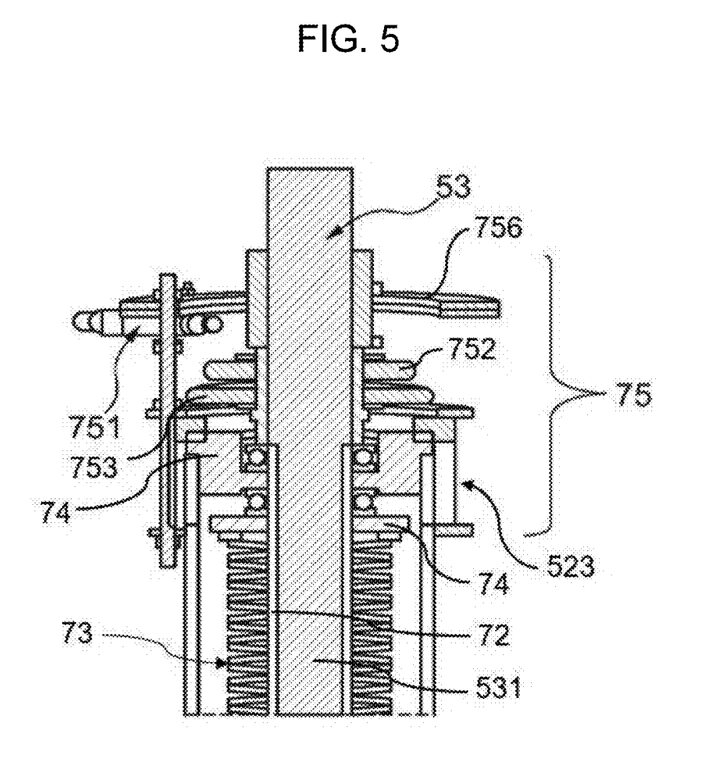
FIG. 5 is a sectional view of the view in FIG. 4.

In addition, as shown in FIGS. 4 and 5, the energy storage and restoration device may comprise a means of control 75, which comprises a first detector 750 and a first marker 752, for example, to trigger storage by rotation of the worm screws. It may also comprise a second detector 751 and a second marker 753, to stop the storage of energy.

In the example shown in FIG. 3, the compressible component 73 comprises Belleville washers guided around a sheath 72 arranged around the extension 531 of the worm screw between the lower guide ring 70 and the thrust ball bearing 74.

A stop nut 71 is mounted fixed at the lower end of extension 531 and under the guide ring 70 and is used to preload the compressible component 73. The extension 531 is free inside the sheath 72. The guide tube 52 is closed by a screw ring 523, which enables the trapezoidal worm screw 53 to pass freely through it. The upper part of the sleeve 72 is guided in rotation and translation in the thrust ball bearing 74. The guide ring 70 is mounted in the guide tube 52 so that it can rotate and move freely.

Initialization:

After the insertion of a new drum 2, the lowering of the follower plate 4/transfer pump 6 assembly is triggered (by an operator support via a two-hand control), causing the trapezoidal screws to rotate and consequently the lowering of the plate.

When the follower plate 4 comes back into contact with the top of the glue contained in the drum 2, the plate 4 is stopped by the incompressibility of the glue. When the assembly of the plate 4, the tie rods 56 and beam 55 and nuts 550 has become static, the trapezoidal screws 53, which are kept in rotation, cause the worm screws 53 and their extensions 531 to move upwards via the nuts 550 and consequently the compression of the spring washers 73. This compression of the Belleville washers results from the upward movement of the lower guide rings 70, while the thrust ball bearings 74 are prevented from moving.

Since the first reference component 752 ("energy storage request" ring) and the second reference component 753 ("energy storage stop" ring) are mounted in a fixed position with respect to the trapezoidal screw 53, they also move up to a ring 756 supporting the energy storage management detectors 750, 751, starting from the rest position shown in FIG. 4.

Automatic Operation:

When the "energy storage request ring 752" passes in front of the first detector 750 and comes into electrical contact with it, the system switches to the "energy storage request" mode, the device is now in automatic operation and the trapezoidal screws 53 continue to rotate.

The energy storage is continued until the "energy storage stop" ring 753 is detected by the "energy storage stop" detector 751. The rotation of the trapezoidal screws is then stopped, indicating that the compression of the flexible component 73 is at its maximum level.

The glue transfer from the drum to the dispensing line causes the glue level to drop and consequently the glue level of the follower plate 4 to drop. During this descent, the decompression of the flexible component 73 releases the stored energy to ensure that the pressure required for pumping is maintained on the fluid. This decompression is accompanied by the descent of the rings 752, 753 of energy storage demand and stop of the of. The detection of the "demand storage" ring 753 by the detector 751 again causes the rotation of the trapezoidal screws 53 enabling the re-compression of the flexible components.

The energy storage and restoration cycles are thus linked until the empty drum detection is reached.

When the drum is empty, the lifting of the plate/pump assembly is started by the operator by pressing and releasing the two-hand control.

According to an alternative embodiment, the initialization step and/or the pumping up of the follower plate can also be automated.

Figure 6:
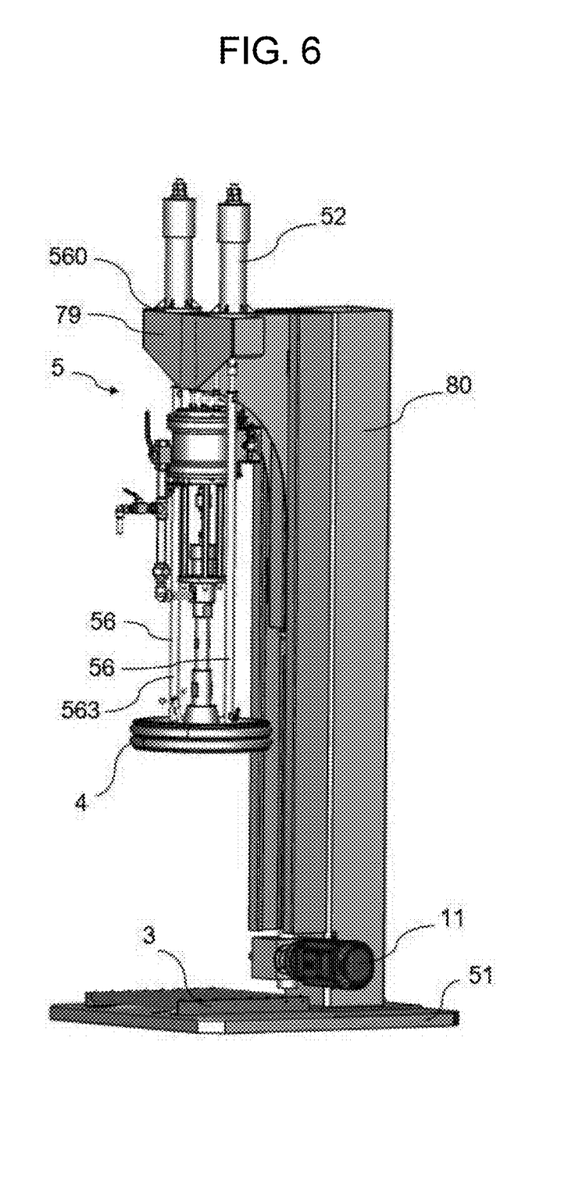
FIG. 6 is an overview of a viscous fluid transfer station in a first position, according to a second example embodiment of the invention.

FIG. 6 shows a transfer station for viscous media such as glue, according to a second example embodiment of the invention.

In this example embodiment, the means of energy storage and restoration is also composed of two stacks of Belleville washers placed in two guide tubes 52. The guide tubes are here placed on an extension 562 of the two tie rods 56.

Figure 7:
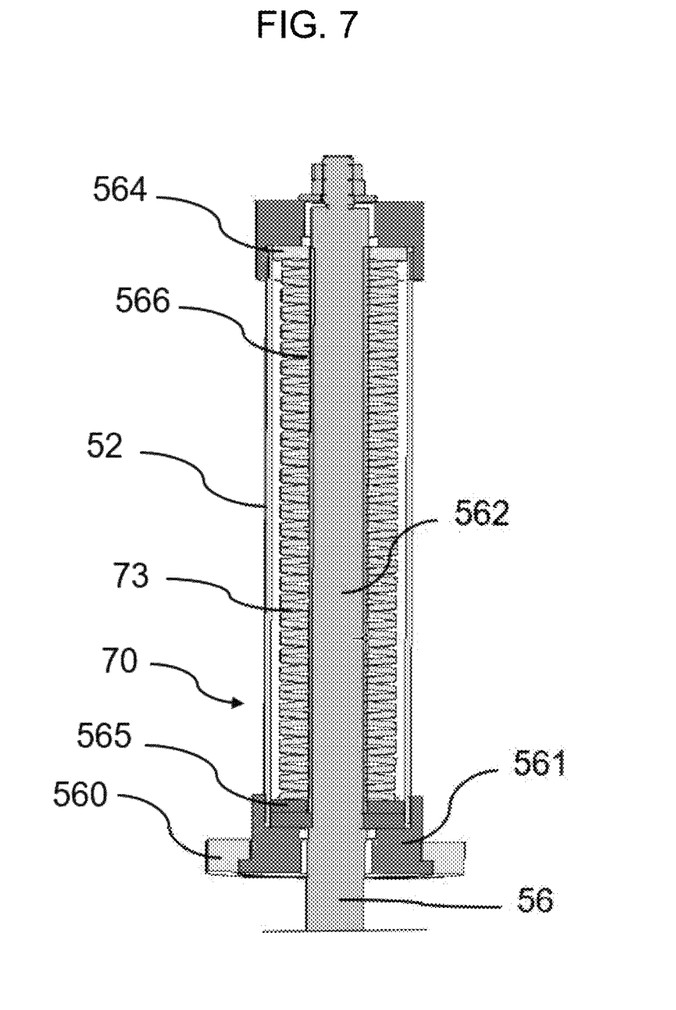
FIG. 7 is a detailed view of a guide tube of the viscous fluid transfer station of FIG. 6.

FIG. 7 is a partial view of the viscous fluid transfer station according to the second example embodiment of the invention in FIG. 6, showing a longitudinal section view of a guide tube 52.

Inside the guide tubes, one finds a configuration similar in principle to that of the first example embodiment. Thus, the Belleville washers 73 are placed around sheaths 566 arranged around the tie rods extensions 562 as they were around the worm screw extensions 531 in the first example embodiment. However, since the orientation of the guide tubes is reversed as compared to the first example, the guide rings 564 are located in the upper part of the tubes and the thrust ball bearings 565 in the lower part.

The guide tubes are mounted on a bracket 79 which may be moved vertically on a guide column 80. The bracket is moved in the guide column by means of a worm screw, which is not visible in this figure because it is located vertically inside the guide column. The worm screw is driven by a motor 11. When the worm screw is driven in a first direction of rotation, the crane arm rises, while when the worm is driven in the opposite direction, the bracket descends. The bracket may be moved in the guide column by any other means, such as by means of a cylinder or linear motor.

FIG. 6 shows the bracket in its upper position, in which a glue drum may be inserted. Once an open drum has been inserted into the viscous fluid dispensing system, the bracket 79 is lowered by rotating the worm screw until the follower plate 4 comes into contact with the glue. Once the follower plate is in contact with the glue, the downward movement of the bracket enables pressure to be exerted on the glue to cause it to be transferred.

If the pressure is maintained above a certain threshold, the Belleville washers may be compressed by moving the bracket further down. This additional displacement of the stem, by 100 mm for example, while the follower plate and the tie rods 56 are stationary due to the incompressibility of the glue, leads to a relative displacement of the guide tubes 52 in relation to the tie rods 56, with the tie rods moving up inside the guide tubes, and a compression of the Belleville washers 73 by the guide rings 564 acting as compression component 564 enabling energy to be stored.

The transfer of glue from the drum to the dispensing line causes the glue level to drop and consequently the follower plate to descend. The flexible washers then release the stored energy at the rate of the descent of the tie rods into the guide tubes.

In a similar way to what was described for the first example embodiment of the invention, position detectors and markers attached to the tie rods make it possible to control the energy storage and restoration phases, each storage phase corresponding to a complementary descent of the bracket.

Figure 8:
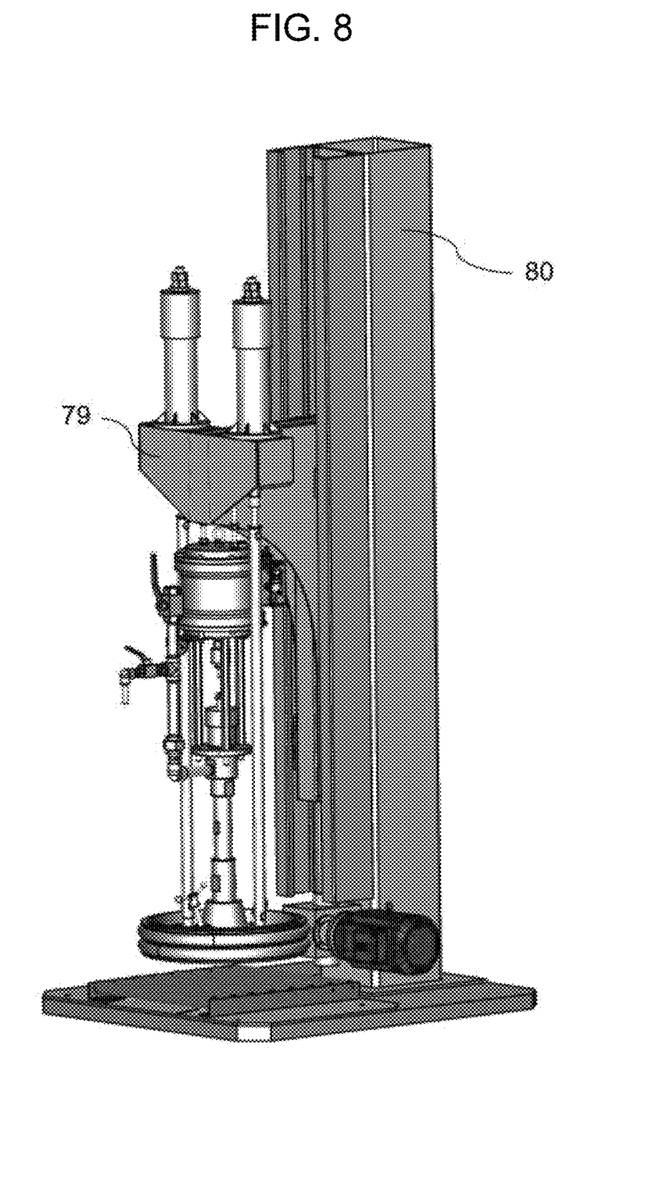
FIG. 8 is an overview of the viscous fluid transfer station of FIG. 6, in a second position.

In FIG. 8, the bracket 79 is shown in the lower position on the guide column 80, the position taken by the bracket when the drum is empty (the drum is not shown, for more clarity).

The invention claimed is:

1. A device for pressurizing a viscous fluid contained in a drum having an upper end and an opening at the upper end, the device comprising:
   a base arranged to receive the drum;
   a motorized support system;
   a follower plate vertically movable along an axis perpendicular to said base and passing through a center of the drum when the drum is on the base, said follower plate:
      being carried by the support system and being movable between a first position outside the drum and a second position inside the drum to exert pressure on the viscous fluid,
      having same dimensions as the opening of the drum so that when the follower plate is in the drum a perimeter of the follower plate seals the drum, and
      having a transfer port intended configured to be connected to a means of pumping that transfers the pressurized fluid; and
   a flexible means of storing and releasing energy connected to the support system, said flexible means configured to store energy when the flexible means is compressed under an effect of pressure exerted by the support system when the pressure of the follower plate on the viscous fluid is below a certain predetermined threshold, and to release the energy to the follower plate when the flexible means is decompressed to maintain the pressure of the viscous fluid while the support system is at rest,
   wherein the support system comprises:
      a dock,
      two vertical guide tubes each fixed to the dock by a lower end and having a free upper end comprising a fixed means of guiding, said guide tubes being spaced apart by the base,
      two worm screws each having a lower part inserted into one of the tubes via the fixed means of guiding and an upper part outside the tube,
      an upper beam perpendicular to the worm screws, fixed to the upper ends of the two screws and comprising means of rotating said worm screws, and
      a lower beam perpendicular to the worm screws and connected to the follower plate by two tie rods, said lower beam being movably mounted on the upper part of the screws such that the follower plate moves between the first and the second positions when the screws are rotated.

2. The pressurization device according to claim 1, wherein the flexible means of storing and releasing energy comprises:
   a compression component mounted on the lower part of a screw,
   a flexible component arranged in the tube between the compression component and a thrust ball bearing fixed relative to the tube, said thrust ball bearing being closer to the upper end than the compression component, and
   a means of control configured to engage and stop a compression of the flexible component by the compression component.

3. The pressurization device according to claim 2, wherein the means of control comprises a first detector and a first marker for initiating energy storage, and a second detector and a second marker for stopping the energy storage.

4. The pressurization device according to claim 2, wherein the flexible component comprises at least one of a spring and Belleville washers.

5. The device according to claim 1, wherein the base comprises a means of fixing the drum.

6. A viscous fluid transfer station, comprising:
   a pressurization device according to claim 1; and
   a means of pumping connected to the port of the follower plate.

7. The viscous fluid transfer station according to claim 6, in which the means of pumping is a pneumatic pump integral with the follower plate.

8. A viscous fluid dispensing system, comprising:
   a fluid transfer station according to claim 6;
   a dosing pump;
   supply hoses; and
   a fluid extrusion system.

9. A method for transferring a viscous fluid using the transfer station according to claim 6.

10. The device according to claim 2, wherein the base comprises a means of fixing the drum.

11. The device according to claim 3, wherein the base comprises a means of fixing the drum.

12. The device according to claim 4, wherein the base comprises a means of fixing the drum.

* * * * *